United States Patent
Shibutani et al.

(10) Patent No.: US 12,411,680 B2
(45) Date of Patent: Sep. 9, 2025

(54) CONTROL SYSTEM, CONTROL DEVICE, CONTROL PROGRAM UPDATE METHOD, AND NON-TRANSITORY STORAGE MEDIUM

(71) Applicant: TOYOTA JIDOSHA KABUSHIKI KAISHA, Toyota (JP)

(72) Inventors: Tomoki Shibutani, Nisshin (JP); Keita Kinoshita, Toyota (JP); Kazuyoshi Shiohara, Nagoya (JP); Masaki Miyake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 18/317,135

(22) Filed: May 15, 2023

(65) Prior Publication Data

US 2024/0012634 A1    Jan. 11, 2024

(30) Foreign Application Priority Data

Jul. 5, 2022 (JP) .................. 2022-108367

(51) Int. Cl.
  *G06F 9/445* (2018.01)
  *G06F 8/61* (2018.01)
  *G06F 8/65* (2018.01)
  *G06F 8/71* (2018.01)
  *H04L 67/125* (2022.01)

(52) U.S. Cl.
  CPC .................. *G06F 8/65* (2013.01); *G06F 8/61* (2013.01); *G06F 8/71* (2013.01); *H04L 67/125* (2013.01)

(58) Field of Classification Search
  CPC ..... G06F 8/61; G06F 8/65; G06F 8/71; G06F 9/442; G06F 11/1433; G06F 11/1438; G06F 8/658; H04L 67/125; B60W 2050/0002; B60W 50/00; B60R 16/02; H04W 4/44; H04W 4/48
  See application file for complete search history.

(56) References Cited

U.S. PATENT DOCUMENTS

| 2019/0138296 | A1 | 5/2019 | Ishikawa et al. |
| 2019/0258470 | A1 | 8/2019 | Miyake et al. |
| 2020/0387368 | A1 | 12/2020 | Jeong et al. |
| 2022/0391124 | A1* | 12/2022 | Darji ..................... G06F 3/0679 |

FOREIGN PATENT DOCUMENTS

| CN | 112567337 A | * | 3/2021 | .......... B60R 16/023 |
| JP | 2019-84941 A | | 6/2019 | |
| JP | 2019-144670 A | | 8/2019 | |
| JP | 2019-168834 A | | 10/2019 | |
| JP | 2020-135578 | | 8/2020 | |
| WO | WO-2019/187535 A1 | | 10/2019 | |

* cited by examiner

*Primary Examiner* — Chuck O Kendall
(74) *Attorney, Agent, or Firm* — Oblon, McClelland, Maier & Neustadt, L.L.P.

(57) ABSTRACT

A control system includes a plurality of control devices each including a plurality of storage areas. Each of the control devices is configured to: execute a control program stored in a storage area set as an execution storage area; execute switching preparation in a state in which an updated version of the control program has been installed on a writing plane; make a shutdown when all the control devices have completed the switching preparation; and set the writing plane as the execution storage area at a next startup when all the control devices are shut down in a state in which the switching preparation has been completed in all the control devices.

9 Claims, 6 Drawing Sheets

CONTROL SYSTEM, CONTROL DEVICE, CONTROL PROGRAM UPDATE METHOD, AND NON-TRANSITORY STORAGE MEDIUM

CROSS-REFERENCE TO RELATED APPLICATION

This application claims priority to Japanese Patent Application No. 2022-108367 filed on Jul. 5, 2022, incorporated herein by reference in its entirety.

BACKGROUND

1. Technical Field

The present disclosure relates to a control system, a control device, a control program update method, and a non-transitory storage medium.

2. Description of Related Art

There is known a vehicle including a control system including a plurality of control devices. For example, software for controlling an actuator mounted on the vehicle is installed in each of the control devices. After the vehicle is supplied to the market, an update program (updated version of a control program) may be provided to the vehicle, for example, using over the air (OTA). The vehicle can update the software of the control system by using the provided update program. By updating the software in at least one control device in the control system, the function of the vehicle is updated (for example, corrected or added). Regarding control to be performed in cooperation among the control devices (for example, driving assistance control such as autonomous driving control), the versions of the control programs to be executed by the control devices need to be consistent.

In Japanese Unexamined Patent Application Publication No. 2019-144670 (JP 2019-144670 A), each execution unit in a control system acquires, from another execution unit, an identifier included in a control program to be executed by the other execution unit. Based on the acquired identifier, the execution unit determines whether the control program to be executed by the other execution unit has been changed.

SUMMARY

By checking the identifiers of the control programs to be executed by the control devices, it is possible to check whether software inconsistency has occurred among the control devices. However, it is desirable to suppress the software inconsistency before it occurs. From the viewpoint of user's convenience, it is desirable that the control programs (software products) be updated all at once in the control devices when the control devices are started.

Vehicle software update using OTA is performed, for example, by a procedure including download (transmission of new software to the vehicle), installation (writing of the new software to the control device), and activation (enabling of the new software written to the control device). The control devices whose new software products have been activated (preparation for activation has been completed) through the above procedure are shut down all at once and then started all at once, thereby updating the software products of the control devices to the new software products.

However, the control devices are not always shut down all at once at a desired timing. Only some of the control devices may be shut down before completion of activation due to a momentary power failure or the like. In this case, the control devices that have not completed the activation execute the pre-update software products after startup, and the other control devices that have completed the activation execute the new software products (updated software products). In such a case, software inconsistency may occur among the control devices.

The present disclosure provides a control system, a control device, a control program update method, and a non-transitory storage medium that suppress software inconsistency among a plurality of control devices when software products in the control devices are updated.

A control system according to a first aspect of the present disclosure includes a plurality of control devices. Each of the control devices includes a plurality of storage areas. Each of the control devices is configured to execute a control program stored in any storage area set as an execution storage area among the plurality of storage areas. Each of the control devices is configured to execute switching preparation when each of the control devices updates the control program in a state in which an updated version of the control program has been installed on a writing plane of each of the control devices. The writing plane is the storage area other than the storage area set as the execution storage area. The switching preparation is preparation for switching of a setting of the execution storage area. Each of the control devices is configured to make a shutdown when all the control devices have completed the switching preparation. Each of the control devices is configured to set the writing plane as the execution storage area at a next startup when all the control devices are shut down in a state in which the switching preparation has been completed in all the control devices.

Hereinafter, the execution storage area will also be referred to as "active plane". The storage area in which the updated version of the control program stored in the execution storage area is installed will also be referred to as "writing plane".

Among the processes related to activation in the control system, the process related to the preparation for the switching of the active plane is executed before the shutdown, and the process related to the switching of the active plane is executed at the startup after the shutdown. In order to update software (control program), it is necessary to prepare for the switching of the active plane (that is, prepare for the setting of the writing plane as the active plane) after the installation of new software (updated version of the control program). In the process related to the switching preparation, the control device is brought into a switching-ready state (that is, a state in which the control device operates normally even when the active plane is switched to the writing plane from the storage area currently set as the active plane). In the control device in the switching-ready state, there is no remaining task to be executed by the pre-update control program, and the execution of the pre-update control program is unnecessary. Therefore, the control device in the switching-ready state can smoothly update the software simply by switching the active plane (setting the writing plane as the active plane) at the next startup after the shutdown.

In the control system, when all the control devices are shut down in the switching-ready state, the control devices switch the active planes at the next startup. It is unlikely that any of the control devices is shut down due to a momentary power failure or the like during the short period immediately after the startup (period during which the active planes are switched). Thus, with the control system, it is possible to suppress the software inconsistency among the control devices when the software products are updated in the control devices.

The control system according to the first aspect may have any of the configurations described below.

In the control system according to the first aspect of the present disclosure, all the control devices may be configured not to switch the setting of the execution storage area at the next startup when at least one of the control devices is shut down before the switching preparation is completed in the at least one of the control devices.

The switching preparation tends to require a longer period than that for the switching of the active plane. For this reason, any of the control devices may be shut down due to a momentary power failure or the like during the preparation for the switching of the active plane. In this regard, with the above configuration, all the control devices do not switch the active planes at the next startup when at least one of the control devices is shut down due to a momentary power failure or the like before being brought into the switching-ready state. Therefore, the software inconsistency is unlikely to occur among the control devices.

In the control system according to the first aspect of the present disclosure, each of the control devices may be configured to, when each of the control devices has completed the switching preparation, transmit a preparation completion signal indicating that the switching preparation has been completed. The control devices may be configured to exchange the preparation completion signals with each other through ring communication.

With the above configuration, one control device in the plurality of control devices can grasp that the other control devices are brought into the switching-ready state based on the preparation completion signals received from the other control devices. The ring communication makes it easier to suppress tightness of communication among the control devices.

In the control system according to the first aspect of the present disclosure, each of the control devices may be configured to, when each of the control devices has completed the switching preparation, transmit a preparation completion signal indicating that the switching preparation has been completed. The control devices may be configured to exchange the preparation completion signals with each other through star communication.

With the above configuration, a predetermined control device in the plurality of control devices can grasp that the other control devices are brought into the switching-ready state based on the preparation completion signals received from the other control devices. The other control devices can directly transmit the preparation completion signals to the predetermined control device through the star communication. This makes it easier for the predetermined control device to quickly grasp the states of the other control devices.

In the control system according to the first aspect of the present disclosure, the control devices may include a first control device, a second control device, and a third control device. The first control device may be configured to receive a shutdown request from a user. The first control device may be configured to, when the updated versions of the control programs are installed in all the first control device, the second control device, and the third control device at a time of reception of the shutdown request by the first control device, transmit a switching instruction to each of the second control device and the third control device. The first control device may be configured to start the switching preparation after the switching instruction is transmitted. Each of the second control device and the third control device may be configured to start the switching preparation when the switching instruction is received.

With the above configuration, the process related to the preparation for the switching of the active plane is started in response to the request from the user. Therefore, the software update process can easily be executed at a timing that does not impair the user's convenience.

In the control system according to the first aspect of the present disclosure, the first control device may be configured to, when the first control device updates the control program in a state in which the updated version of the control program is not installed in either the second control device or the third control device, determine in which of the second control device and the third control device the updated version of the control program is installed. The first control device may be configured to transmit the switching instruction to the control device in which the first control device determines that the updated version of the control program is installed. The first control device may be configured not to transmit the switching instruction to the control device in which the first control device determines that the updated version of the control program is not installed.

With the above configuration, the switching instruction is not transmitted to the control device in which the new software is not installed. Thus, unnecessary communication is suppressed.

In the control system according to the first aspect of the present disclosure, each of the control devices may be configured to control a vehicle. The vehicle may include a start switch for the user to start a vehicle system. The first control device may be configured to receive an input of the shutdown request in response to an operation of the user to turn OFF the start switch. Each of the control devices may be configured to start in response to an operation of the user to turn ON the start switch.

With the above configuration, in response to the operations of the user on the start switch of the vehicle, the process related to the preparation for the switching of the active plane is started, and each control device is started after the shutdown. Therefore, the software update process can easily be executed at a timing that does not impair the user's convenience.

The vehicle may be an electrified vehicle (xEV) that utilizes electric power as a power source in whole or in part. The xEV includes a battery electric vehicle (BEV), a plug-in hybrid electric vehicle (PHEV), a hybrid electric vehicle (HEV), a fuel cell electric vehicle (FCEV), and the like.

A control device according to a second aspect of the present disclosure includes one or more memories including a plurality of storage areas, and one or more processors. The one or more processors are configured to: set any storage area as an execution storage area among the plurality of storage areas; execute a control program stored in the any storage area set as the execution storage area among the plurality of storage areas; and install an update program that is an updated version of the control program on a writing plane. The writing plane is the storage area other than the storage area set as the execution storage area. The storage areas include a first storage area and a second storage area. When each of a plurality of control devices including the control device updates the control program in a state in which the first storage area is set as the execution storage area and the update program is installed in the second storage area set as the writing plane, the one or more processors are configured to execute switching preparation, and the control device is configured to make a shutdown when all the control devices have completed the switching preparation. The switching preparation is preparation for switching of the execution storage area to the second storage area. The one or more processors are configured to switch the execution storage area from the first storage area to the second storage area at a next startup of the control device that is shut down in a state in which the switching preparation has been completed.

In the control device as well as the control system described above, it is possible to suppress the software inconsistency among the control devices when the software products are updated in the control devices.

A control program update method according to a third aspect of the present disclosure includes installing, in a writing plane of each of a plurality of control devices, an updated version of a control program stored in any storage area set as an execution storage area among a plurality of storage areas of each of the control devices. The writing plane is the storage area other than the storage area set as the execution storage area. The control program update method includes executing switching preparation by each of the control devices in which the updated version of the control program has been installed. The switching preparation is preparation for switching of a setting of the execution storage area. The control program update method includes shutting down all the control devices when all the control devices have completed the switching preparation. The control program update method includes setting the writing plane as the execution storage area at a next startup by all the control devices that are shut down in a state in which the switching preparation has been completed.

In the control program update method as well as the control system described above, it is possible to suppress the software inconsistency among the control devices when the software products are updated in the control devices.

A non-transitory storage medium according to a fourth aspect of the present disclosure stores a function for causing a computer to execute the control program update method according to the third aspect of the present disclosure. A certain embodiment provides a computer device including a storage device that stores the above program and a processor that executes the program stored in the storage device. Another embodiment provides a computer device that distributes the program.

With the present disclosure, it is possible to suppress the software inconsistency among the control devices when the software products are updated in the control devices.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described in detail with reference to the drawings. The same or corresponding parts are denoted by the same signs throughout the drawings, and description thereof will not be repeated.

Figure 1:
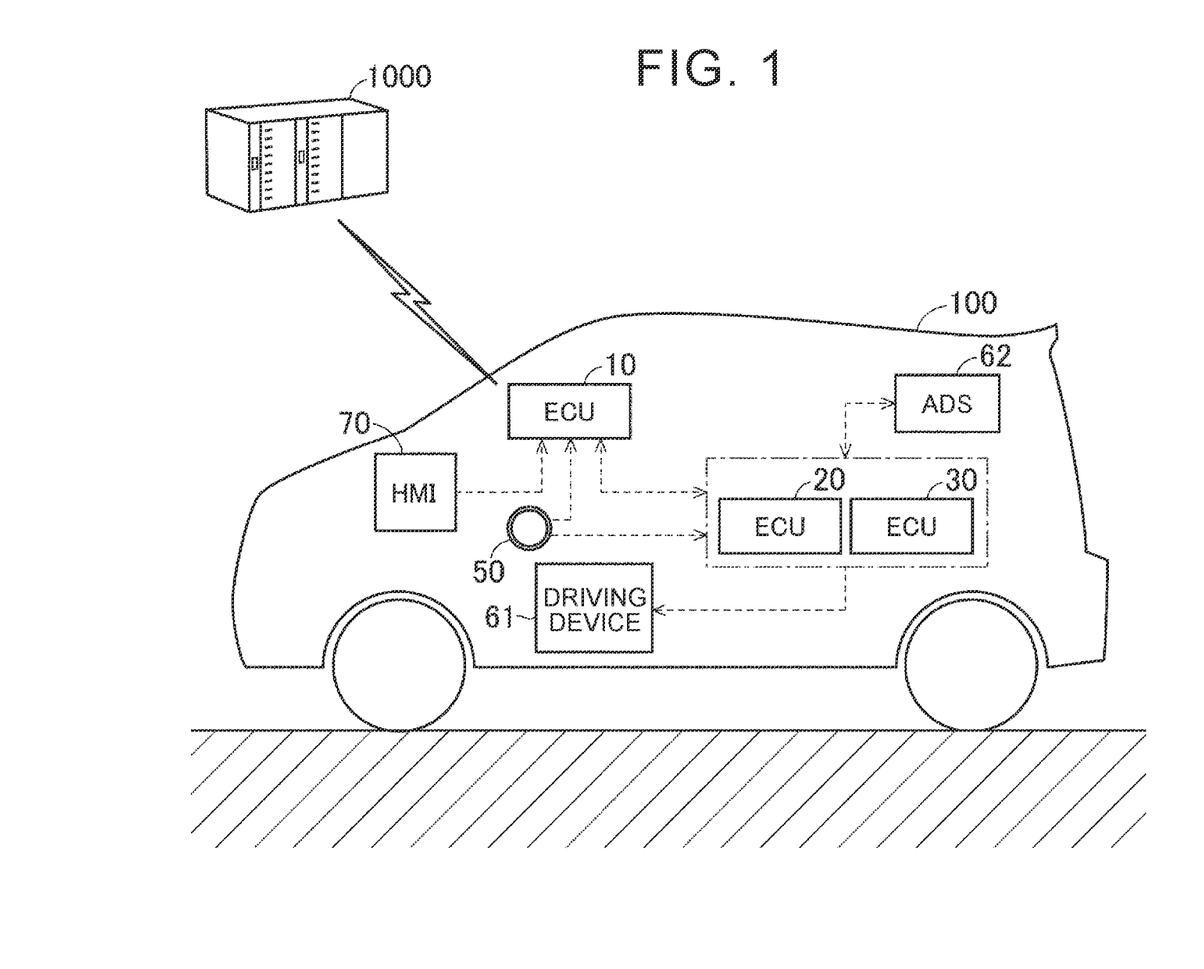
FIG. 1 is a diagram showing a configuration of a vehicle according to an embodiment of the present disclosure.

FIG. 1 is a diagram showing a configuration of a vehicle 100 according to the present embodiment. Referring to FIG. 1, the vehicle 100 is, for example, a battery electric vehicle (BEV) that does not include an internal combustion engine. The vehicle 100 includes electronic control devices (ECUs) 10, 20, 30, a start switch 50, a driving device 61, an autonomous driving system (ADS) 62, and a human-machine interface (HMI) 70. The ECUs 10, 20, 30, the driving device 61, the ADS 62, and the HMI 70 are supplied with electric power from a power supply (for example, an in-vehicle battery) not shown.

The start switch 50 is a switch for a user to start a vehicle system (control system for the vehicle 100). The start switch 50 is mounted, for example, in a vehicle cabin of the vehicle 100. In general, the start switch is referred to as "power switch" or "ignition switch". The vehicle system is switched ON (activated) and OFF (deactivated) when the user operates the start switch 50. By turning ON the start switch 50, the vehicle system (including the ECUs 10, 20, 30) in the deactivated state is started and brought into the activated state (hereinafter also referred to as "IG-ON"). By turning OFF the start switch 50 when the vehicle system is activated, the vehicle system is brought into the deactivated state (hereinafter also referred to as "IG-OFF").

The operation to turn ON the start switch 50 is an operation to switch the state of the vehicle 100 from IG-OFF to IG-ON. When the user turns ON the start switch 50, a startup request is input to each of the ECUs 10, 20, 30. That is, each of the ECUs 10, 20, 30 receives the startup request from the user. The operation to turn OFF the start switch 50 is an operation to switch the state of the vehicle 100 from IG-ON to IG-OFF. When the user turns OFF the start switch 50, a shutdown request is input to each of the ECUs 10, 20, 30. That is, each of the ECUs 10, 20, 30 receives the shutdown request from the user. However, the operation to turn OFF the start switch 50 is prohibited while the vehicle 100 is traveling.

The HMI 70 includes an input device and a display device. The HMI 70 may include a touch panel display. The HMI 70 may include at least one of an in-vehicle infotainment (IVI) system, an instrument panel, a head-up display, and a steering switch.

An over-the-air (OTA) center 1000 uses an OTA technology to perform in-vehicle ECU software update remotely from the center by way of a communication section. The ECU 10 functions as an OTA master. Specifically, the ECU 10 wirelessly communicates with the OTA center 1000. The ECU 10 manages in-vehicle information, receives a campaign from the OTA center 1000, and manages a software update sequence. The ECU 10 serves as an in-vehicle diagnosis device to control the ECUs having an OTA function. In the vehicle 100, the ECUs 10, 20, 30 have the OTA function. In addition to the ECUs 10, 20, the vehicle 100 may further include an ECU (not shown) that does not have the OTA function.

The vehicle 100 is an autonomous driving vehicle capable of autonomous driving. The vehicle 100 according to the present embodiment is configured to execute both manned travel and unmanned travel. While the vehicle 100 is configured to execute unmanned autonomous travel, the vehicle 100 can also be manually driven by the user (manned travel). The vehicle 100 can execute autonomous driving (for example, automatic cruise control) during the manned travel. The level of autonomous driving may be fully autonomous driving (level 5), or may be conditional autonomous driving (for example, level 4).

The ECUs 20, 30 control the driving device 61. The driving device 61 includes an accelerator device, a brake device, and a steering device. The accelerator device includes, for example, a motor generator (hereinafter referred to as "MG"), a power control unit (PCU), and a battery. The MG rotates drive wheels of the vehicle 100. The PCU drives the MG. The battery supplies electric power to the PCU to drive the MG. The MG functions as a motor for travel of the vehicle 100. The brake device includes, for example, a braking device provided on each of the wheels of the vehicle 100, and an actuator that drives the braking device. The steering device includes, for example, an electric power steering system (EPS) and an actuator that drives the EPS.

The ADS 62 includes a recognition sensor (for example, at least one of a camera, a millimeter wave radar, and a lidar) that recognizes an external environment of the vehicle 100. Based on information sequentially acquired by the recognition sensor, the ADS 62 executes a process related to autonomous driving. Specifically, the ADS 62 generates a travel plan (information indicating future behavior of the vehicle 100) suited to the external environment of the vehicle 100 in cooperation with the ECUs 20, 30. Then, the ADS 62 requests the ECUs 20, 30 to control various actuators included in the driving device 61 to cause the vehicle 100 to travel in accordance with the travel plan.

In the present embodiment, the ADS 62 is built in the vehicle 100. However, this is not limitative, and the ADS 62 may be an autonomous driving kit that can be removably mounted on the vehicle 100. A sensor unit (including the recognition sensor) of the autonomous driving kit may be attached to a rooftop of the vehicle 100.

OTA software update according to the present embodiment (update of vehicle software using OTA) is performed by a procedure including configuration synchronization, campaign notification and application approval, download, installation, activation, and software update completion notification.

The vehicle 100 starts the configuration synchronization in response to, for example, an operation to turn ON the start switch 50. The process of configuration synchronization by the vehicle 100 includes transmitting vehicle configuration information to the OTA center 1000. The vehicle configuration information includes, for example, hardware information (information indicating product numbers of hardware, identifiers of the ECUs, etc.) and software information (information indicating product numbers of software, etc.) for the individual ECUs in the vehicle 100. The vehicle configuration information may further include Regulation X Software Identification Number (RXSWIN) for each approval target. The RXSWIN is an identification number that can identify software that constitutes the functional model approval.

When the vehicle configuration information is received from the vehicle 100, the OTA center 1000 checks a campaign that is currently run. When there is a campaign applicable to the vehicle 100 that has transmitted the vehicle configuration information, the OTA center 1000 transmits information about the campaign (campaign information) to the vehicle 100 in response to the reception of the vehicle configuration information. The campaign information includes, for example, campaign attribute information (information indicating the purpose of the software update, the function of the vehicle that may be affected by the update, etc.), a list of vehicles as targets for the campaign, information about ECUs as targets for the campaign (for example, software information before and after the update), and information about a notification to be sent to the user before and after the update.

When the vehicle 100 receives the campaign information, the vehicle 100 requests the user to input whether to accept the application of the campaign. Specifically, the vehicle 100 causes the HMI 70 to display such a message "New software is found. Do you want to apply it to this vehicle?" and requests the user to input either "accept" or "decline". When the user inputs "accept" on the HMI 70, the vehicle 100 downloads the new software. When the user inputs "decline" on the HMI 70, the vehicle 100 does not execute the download and any process onward.

In the vehicle 100, the ECU 10 serving as the OTA master executes, for example, a process related to download in a procedure described below. The ECU 10 requests the OTA center 1000 for a distribution package including new software. Then, the ECU 10 downloads (receives and saves) the distribution package while performing wireless communication with the OTA center 1000. The distribution package may include, in addition to the new software (for example, a set of update data for each of the ECUs as targets for the campaign), package attribute information (information indicating the update section, the number of pieces of update data in the distribution package, the order of installation for the ECUs, etc.), and update data attribute information (such as an identifier of a target ECU and verification data for verifying the correctness of the update data). The target ECU is an ECU to be the target for the software update except for the OTA master. One or more target ECUs may function as OTA masters.

The distribution package is saved in a storage (not shown) of the ECU 10 through the process related to the download described above. During the download, the HMI informs the user about the progress of the download. After the completion of the download, the ECU 10 verifies the authenticity of the downloaded distribution package. When the verification result is "normal", the ECU 10 notifies the OTA center 1000 about the software update status (completion of download). This notification means that the download has been successful.

When the download is successful, the vehicle 100 executes installation. Specifically, the ECU 10 requests the target ECUs (for example, the ECUs 20, 30) to output the states of the target ECUs and diagnostic trouble codes (DTCs). The ECU 10 determines whether installation is executable for the target ECUs based on the states of the target ECUs and the DTCs. Then, the ECU 10 transfers the new software (update data) to the target ECU for which installation is executable. When the update data is received, the target ECU installs (writes into a non-volatile memory) the update data (update software). Similarly to the target ECU, the ECU 10 (OTA master) may install its own update data in the distribution package. During the installation, the HMI 70 informs the user about the progress of the installation.

When the transfer of the update data from the ECU 10 to the target ECU is completed, the target ECU transmits a transfer completion notification to the ECU 10. When the transfer completion notification is received, the ECU 10 requests the target ECU for integrity verification. The target ECU that receives this request performs verification by using integrity verification data (verification data). Then, the target ECU transmits a verification result to the ECU 10. The ECU 10 saves the verification result (completion, failure, or cancellation of installation) for each target ECU. When the integrity verification is completed for all the target ECUs and all the verification results are "normal", the ECU 10 notifies the OTA center 1000 about the software update status (completion of installation). This notification means that the installation has been successful. When the target ECU has completed installing the update software, the target ECU may transmit a transfer completion notification to the ECU 10.

When the installation is successful following the download, the vehicle 100 executes activation (enables the installed software). An activation method according to the present embodiment will be described later. When a configuration check is successful after completion of the activation, the vehicle 100 causes the HMI 70 to display a result of the software update. The HMI 70 displays, for example, a software update completion screen indicating success in the update. Then, the ECU 10 notifies the OTA center 1000 about the software update status (completion of software update). This notification means that the OTA software update has been successful.

In the present embodiment, an in-vehicle terminal (HMI 70) is adopted as a user terminal. However, any terminal other than the in-vehicle terminal may also be adopted as the user terminal. For example, the user terminal may be a mobile terminal such as a laptop, a tablet terminal, a smart phone, a wearable device (smart watch, smart glasses, etc.), or an electronic key. Any terminal owned by the user may be adopted as the user terminal. The method for notification to the user is not limited to the display, and may be voice notification.

Figure 2:
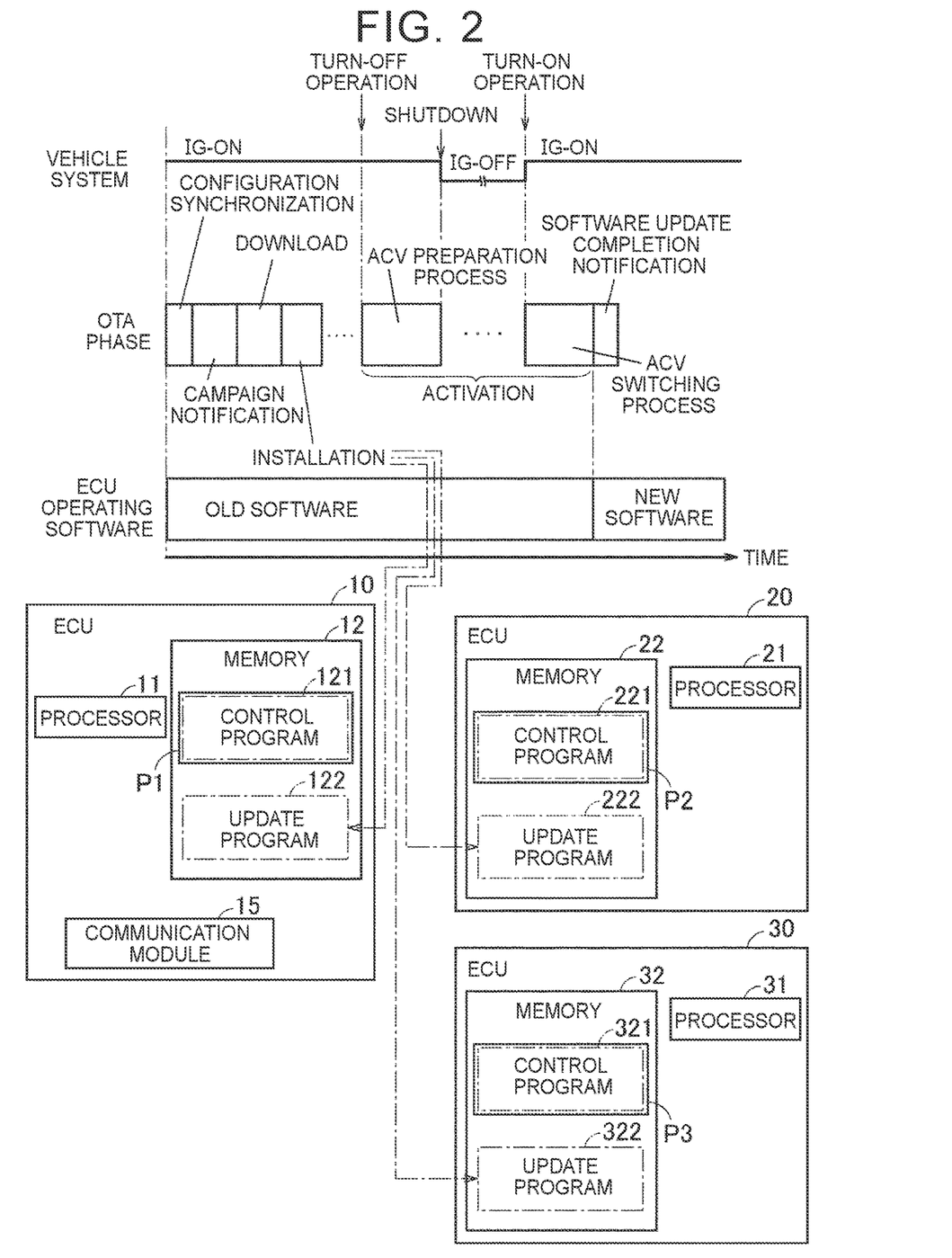
FIG. 2 is a diagram illustrating configurations and functions of control devices in a control system according to the embodiment of the present disclosure.

FIG. 2 is a diagram illustrating configurations and functions of the ECUs 10, 20, 30. Referring to FIG. 2, the ECUs 10, 20, 30 include processors 11, 21, 31 and memories 12, 22, 32, respectively. Each of the processors 11, 21, 31 is, for example, a central processing unit (CPU). Each of the memories 12, 22, 32 is a non-volatile memory such as a flash memory. The memories 12, 22, 32 include first storage areas 121, 221, 321 and second storage areas 122, 222, 322, respectively. In the present embodiment, the ECU 10, the ECU 20, and the ECU 30 are examples of a "first control device", a "second control device", and a "third control device" according to the present disclosure, respectively. Each of the memories 12, 22, 32 is an example of a "storage unit" according to the present disclosure. The ECUs 10, 20, 30 may include one or more processors, respectively. The ECUs 10, 20, 30 may include one or more memories, respectively The ECU 10 includes a communication module 15 for communicating with devices outside the vehicle. The ECU 10 may wirelessly communicate with devices outside the vehicle (for example, the OTA center 1000) via a mobile phone network. The communication module 15 may include a telematics control unit (TCU) and/or a data communication module (DCM) that performs wireless communication. The communication module 15 may further include a communication interface (UF) that performs wired communication with devices outside the vehicle. The ECU 10 may perform wired communication with a scan tool (dedicated tool that performs wired software update) via a data link connector (DLC) not shown.

The ECUs 10, 20, 30 are connected to each other via a communication bus, and configured to perform wired communication. A method for communication between the ECUs is not particularly limited. The method for communication between the ECUs may be, for example, a controller area network (CAN) or Ethernet (registered trademark).

Immediately after the installation is completed in the ECUs 10, 20, 30, the ECUs 10, 20, 30 are, for example, in a state shown in FIG. 2. The first storage areas 121, 221, 321 store control programs (old software products). In the installation, the processors 11, 21, 31 install, in the second storage areas 122, 222, 322, update programs (new software products) that are updated versions of the control programs stored in the first storage areas 121, 221, 321, respectively. The control programs stored in the first storage area 121 and the second storage area 122 (old software product and new software product) are, for example, programs for the processor 11 to centrally control the ECUs (for example, the ECUs 20, 30). The control programs stored in the first storage area 221 and the second storage area 222 (old software product and new software product) are, for example, programs for the processor 21 to execute the autonomous driving control. The control programs stored in the first storage area 321 and the second storage area 322 (old software product and new software product) are, for example, programs for the processor 31 to execute the autonomous driving control.

The processors 11, 21, 31 set either the first storage areas 121, 221, 321 or the second storage areas 122, 222, 322 as active planes P1, P2, P3 (execution storage areas), respectively. In the state shown in FIG. 2, the first storage areas 121, 221, 321 are set as the active planes P1, P2, P3, respectively. The processors 11, 21, 31 execute the control programs stored in the active planes P1, P2, P3 (first storage areas 121, 221, 321), respectively. In the state shown in FIG. 2, each of the second storage areas 122, 222, 322 is an example of a "writing plane" (that is, a storage area in which an updated version of the control program stored in each of the active planes P1, P2, P3 is installed).

The processors 11, 21, 31 execute activation after the installation is completed. In the present embodiment, the processors 11, 21, 31 execute processes related to the activation that are divided into a process related to preparation for switching of the active planes P1, P2, P3 (hereinafter also referred to as "ACV preparation process") and a process related to the switching of the active planes P1, P2, P3 (hereinafter also referred to as "ACV switching process"). The processors 11, 21, 31 execute the ACV preparation process before shutdown, and execute the ACV switching process at startup after the shutdown.

In the ACV preparation process, the processors 11, 21, 31 bring the ECUs 10, 20, 30 into a switching-ready state. The switching-ready state is a state in which the ECU operates normally even when the ACV switching process described later is executed. For example, the processors 11, 21, 31 complete tasks to be executed by the old software products, and close all the tasks associated with the old software products.

In the ACV switching process, the processors 11, 21, 31 switch the active planes P1, P2, P3 from the first storage areas 121, 221, 321 to the second storage areas 122, 222, 322, respectively. That is, the processors 11, 21, 31 set the second storage areas 122, 222, 322 as the active planes P1, P2, P3, respectively.

When the ECUs 10, 20, 30 in the state shown in FIG. 2 update the control programs, the processors 11, 21, 31 perform preparation for the switching of the active planes P1, P2, P3 to the second storage areas 122, 222, 322, respectively (ACV preparation process). The ACV preparation process is started when the user turns OFF the start switch 50. Then, the ECUs 10, 20, 30 are shut down based on the fact that all the ECUs 10, 20, 30 are brought into the switching-ready state. The ECUs 10, 20, 30 that have been shut down in the switching-ready state execute, at the next startup, a process of switching the active planes P1, P2, P3 from the first storage areas 121, 221, 321 to the second storage areas 122, 222, 322, respectively (ACV switching process). The ECUs 10, 20, 30 are started when the user turns ON the start switch 50.

In the present embodiment, each of the processors 11, 21, 31 is an example of a "setting unit", an "execution unit", and a "writing unit" according to the present disclosure. More specifically, the processors 11, 21, 31 execute a series of processes shown in FIGS. 3 and 4 described later. The functions of these units may be implemented by programs stored in storage devices (for example, the memories 12, 22, 32 or storages that is not shown) and the processors 11, 21, 31 executing the programs. Alternatively, the functions of these units may be implemented by dedicated hardware (electronic circuits). Similar functions may be implemented by dividing the functions between software and hardware. The numbers of processors and memories in each ECU are arbitrary. At least one of the ECUs 10, 20, 30 may include a plurality of processors or a plurality of memories. Each of the ECUs may include a plurality of microcomputers in the form of a main microcomputer, a sub microcomputer, and the like.

Figure 3:
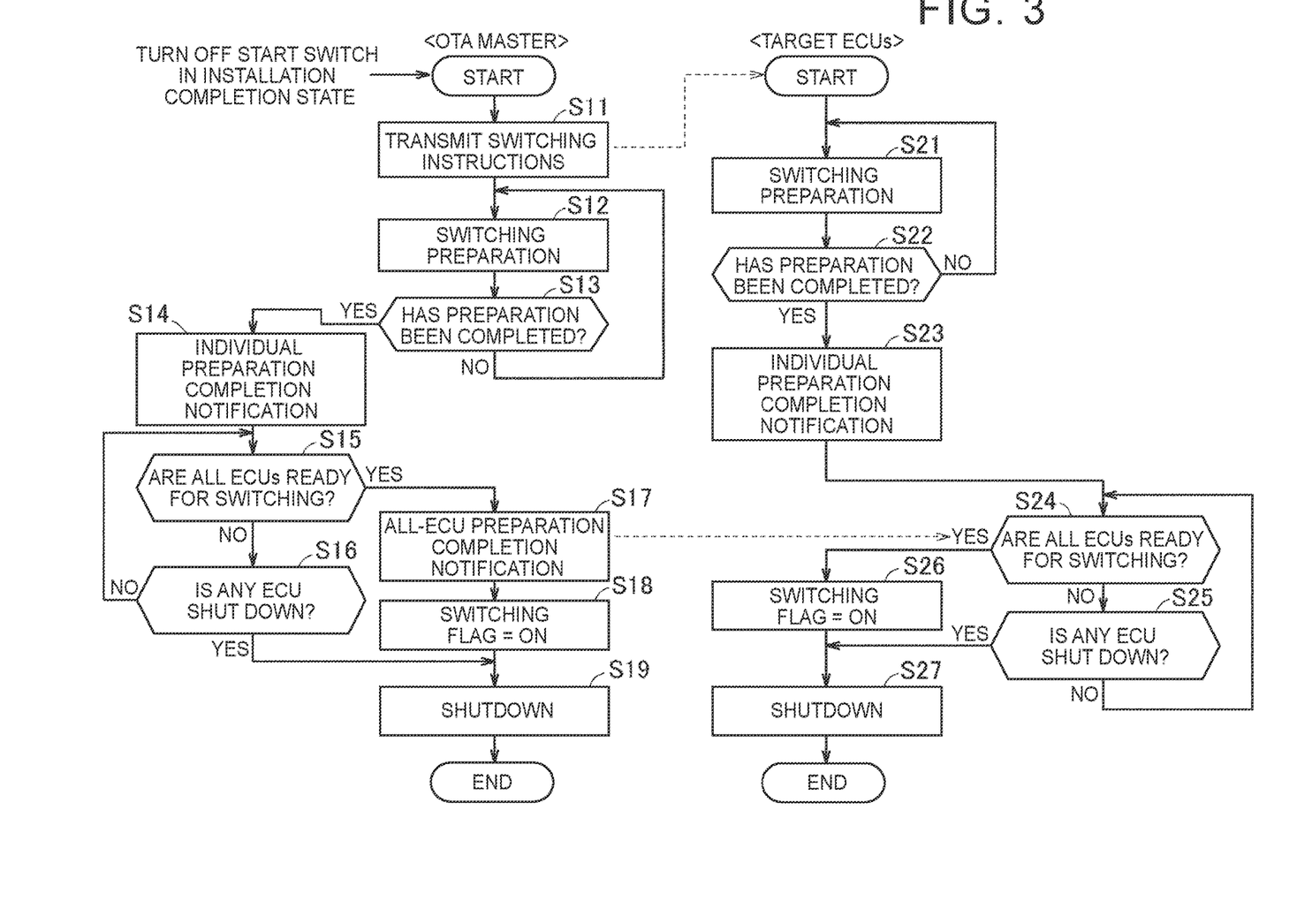
FIG. 3 is a flowchart showing a process related to preparation for switching of active planes in an activation method according to the embodiment of the present disclosure.

FIG. 3 is a flowchart showing the process related to the preparation for the switching of the active planes (ACV preparation process) in the activation method according to the present embodiment. The process shown in the flowchart of FIG. 3 is executed when the start switch 50 is turned OFF while the OTA master and the target ECUs are in an installation completion state.

In the present embodiment, the ECU 10 is the OTA master, and the ECUs 20, 30 are the target ECUs. When the start switch 50 is turned OFF in the installation completion state shown in FIG. 2, the ECU 10 (OTA master) starts a series of processes of Steps S11 to S19 described below. Switching flags to be used in the series of processes described below are prestored in the storage devices (for example, the memories 12, 22, 32 or storages that is not shown) in the ECUs 10, 20, 30, respectively. The switching flag indicating "ON" means that the ACV switching process is permitted at the startup of the ECU. The switching flag indicating "OFF" means that the ACV switching process is prohibited at the startup of the ECU. The initial value of the switching flag is "OFF".

Referring to FIG. 3 together with FIGS. 1 and 2, the ECU 10 transmits switching instructions to the target ECUs (ECUs 20, 30) in Step S11. In the present embodiment, when update programs (updated versions of the control programs) are installed in all the ECUs 10, 20, 30 at the time of reception of a shutdown request from the user by the ECU 10, the ECU 10 executes the process of Step S11 and transmits the switching instructions to the ECUs 20, 30.

In Step S12, the ECU 10 starts the ACV preparation process (preparation for switching of the active planes). In Step S13, the ECU 10 determines whether the ACV preparation process has been completed. While determination is made in Step S13 that "the ACV preparation process has not been completed" (NO in Step S13), the ECU 10 continuously executes the ACV preparation process (Step S12).

When the switching instructions (Step S11) are received from the ECU 10, the target ECUs (ECUs 20, 30) start a series of processes of Steps S21 to S27. In Step S21, the target ECUs start the ACV preparation process (preparation for switching of the active planes). In Step S22, the target ECUs determine whether the ACV preparation process has been completed. While determination is made in Step S22 that "the ACV preparation process has not been completed" (NO in Step S22), the target ECUs continuously execute the ACV preparation process (Step S21). In this manner, the ECUs 20, 30 start the preparation for the switching of the active planes when the switching instructions are received.

When the ACV preparation process of the ECU 10 is completed (YES in Step S13), the ECU 10 transmits, in Step S14, a signal indicating that the ECU (ECU 10) is brought into the switching-ready state (individual preparation completion notification). The individual preparation completion notification transmitted by the ECU 10 in Step S14 is hereinafter referred to as "first preparation completion signal". Although details will be described later, in the present embodiment, the ECUs 10, 20, 30 exchange the individual preparation completion notifications among the ECUs through ring communication (see FIG. 5). The ECU 10 transmits the first preparation completion signal to the ECU 20.

When the ACV preparation process of one of the target ECUs (ECU 20 or 30) is completed (YES in Step S22), the process proceeds to Step S23. The target ECU that has completed the ACV preparation process transmits, in Step S23, a signal indicating that the target ECU is brought into the switching-ready state (individual preparation completion notification).

Specifically, when the ECU 20 has already received the first preparation completion signal, the ECU 20 immediately transmits the individual preparation completion notification to the ECU 30 in Step S23. When the ECU 20 has not received the first preparation completion signal, the ECU 20 waits for reception of the first preparation completion signal, and transmits the individual preparation completion notification to the ECU 30 in S23 after the first preparation completion signal is received. The individual preparation completion notification transmitted by the ECU 20 in Step S23 is hereinafter referred to as "second preparation completion signal".

When the ECU 30 has already received the second preparation completion signal, the ECU 30 immediately transmits an individual preparation completion notification to the ECU 10 in Step S23. When the ECU 30 has not received the second preparation completion signal, the ECU 30 waits for reception of the second preparation completion signal, and transmits the individual preparation completion notification to the ECU 10 in Step S23 after the second preparation completion signal is received. The individual preparation completion notification transmitted by the ECU 30 in Step S23 is hereinafter referred to as "third preparation completion signal".

After the first preparation completion signal is transmitted, the ECU 10 determines in Step S15 whether all the ECUs 10, 20, 30 are brought into the switching-ready state. The ECU 10 makes the determination in Step S15, for example, based on whether the third preparation completion signal has been received. The reception of the third preparation completion signal by the ECU 10 means that all the ECUs 10, 20, 30 are brought into the switching-ready state.

When any of the ECUs 10, 20, 30 is not brought into the switching-ready state (NO in Step S15), the ECU 10 determines in Step S16 whether any target ECU (ECU 20 or 30) is shut down during the preparation for activation due to a momentary power failure or the like. While determination is made as "NO" both in Steps S15, S16, the processes of Steps S15, S16 are repeated.

When any target ECU is shut down before all the ECUs 10, 20, 30 are brought into the switching-ready state, the ECU 10 determines "YES" in Step S16. Then, the process proceeds to Step S19. The ECU 10 is shut down in Step S19. In this case, the switching flag of the ECU 10 at the shutdown is "OFF".

When the ECU 10 does not receive the third preparation completion signal from the ECU 30 even after a predetermined period has elapsed since the ECU 10 transmitted the first preparation completion signal (Step S14), the ECU 10 may determine "YES" in Step S16. Alternatively, the ECU 10 may transmit a check signal to each target ECU and determine "YES" in Step S16 when there is no response from any target ECU. The method for checking whether the ECU is shut down is not limited to the above method, and any method may be adopted.

When all the ECUs 10, 20, 30 are brought into the switching-ready state (YES in Step S15), the ECU 10 transmits, in Step S17, a signal indicating that all the ECUs 10, 20, 30 are brought into the switching-ready state (all-ECU preparation completion notification). The all-ECU preparation completion notification transmitted by the ECU 10 in Step S17 corresponds to a shutdown instruction. The ECU 10 transmits the all-ECU preparation completion notification (shutdown instruction) to each of the ECUs 20, 30 in Step S17.

After the all-ECU preparation completion notification is transmitted, the ECU 10 turns ON the switching flag in Step S18. Then, the ECU 10 is shut down in Step S19. In this case, the switching flag of the ECU 10 at the shutdown is "ON". When the process of Step S19 is executed, the series of processes of Steps S11 to S19 is terminated.

After the target ECUs (ECUs 20, 30) have transmitted the individual preparation completion notifications in Step S23, the target ECUs determine in Step S24 whether all the ECUs 10, 20, 30 are brought into the switching-ready state. For example, when the all-ECU preparation completion notifications (Step S17) are received, the target ECUs determine "YES" in Step S24. When the all-ECU preparation completion notifications (Step S17) are not received, the target ECUs determine "NO" in Step S24. When any of the ECUs 10, 20, 30 is not brought into the switching-ready state (NO in Step S24), the target ECUs determine in Step S25 whether the other ECUs are shut down during the preparation for activation due to a momentary power failure or the like. When the ECU 20 executes the process of Step S25, the ECUs 10, 30 correspond to the "other ECUs". When the ECU 30 executes the process of Step S25, the ECUs 10, 20 correspond to the "other ECUs". When the target ECUs do not receive the all-ECU preparation completion notification (Step S17) from the ECU 10 even after a predetermined period has elapsed since the target ECUs transmitted the individual preparation completion notifications in Step S23, the target ECUs may determine "YES" in Step S25. Any method may be adopted as the method for checking whether the ECU is shut down (determination method in Step S25).

While determination is made as "NO" both in Steps S24, S25, the processes of Steps S24, S25 are repeated. When any ECU is shut down before all the ECUs 10, 20, 30 are brought into the switching-ready state (YES in Step S25), the process proceeds to Step S27. The target ECUs are shut down in Step S27. In this case, the switching flags of the target ECUs (ECUs 20, 30) at the shutdown are "OFF".

When all the ECUs 10, 20, 30 are brought into the switching-ready state (YES in Step S24), the target ECUs (ECUs 20, 30) turn ON the switching flags in Step S26. Then, the target ECUs are shut down in Step S27. In this case, the switching flags of the target ECUs (ECUs 20, 30) at the shutdown are "ON". The process of Step S27 is executed, and then, the series of processes of Steps S21 to S27 is terminated.

Figure 4:
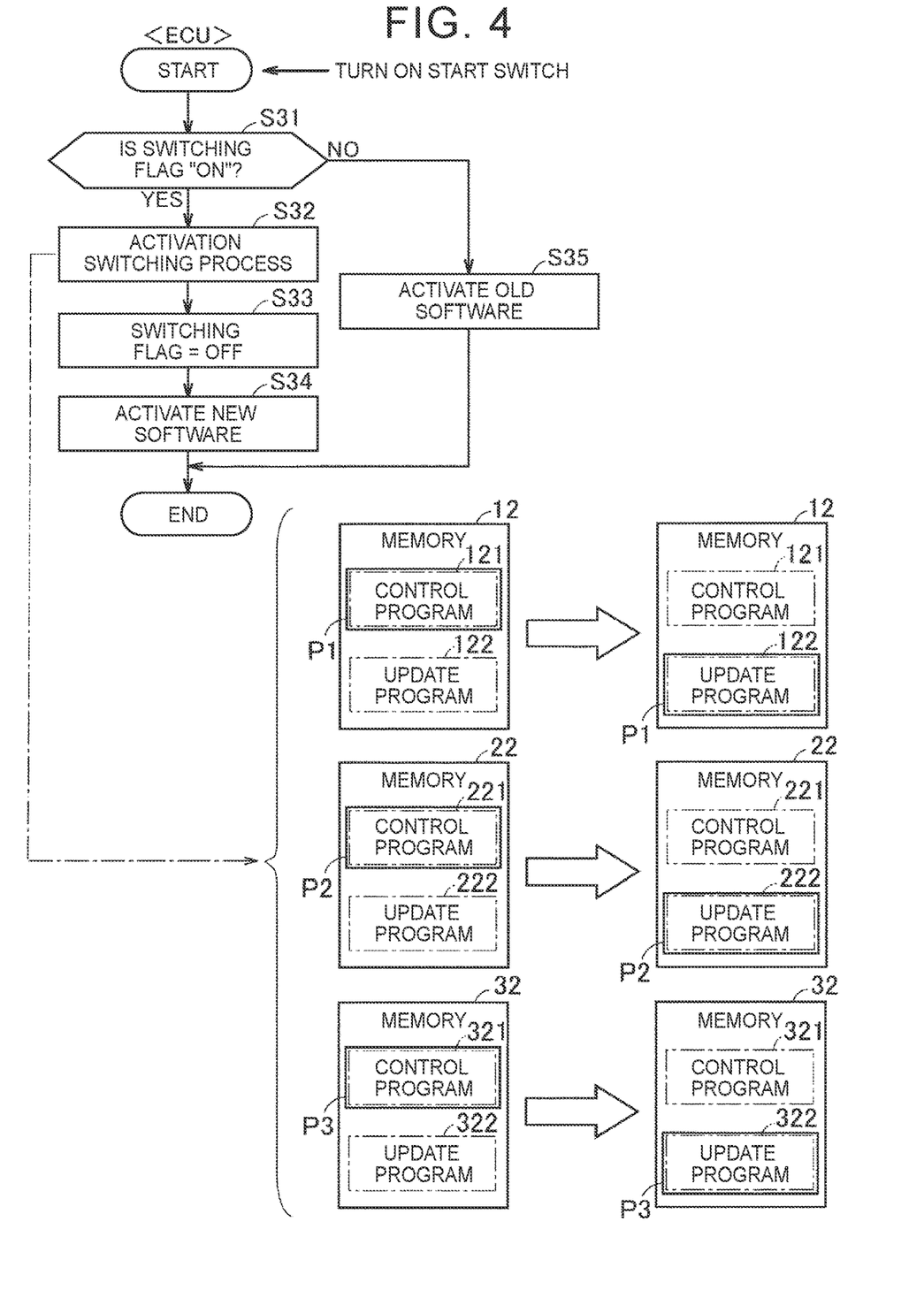
FIG. 4 is a flowchart showing a process related to the switching of the active planes in the activation method according to the embodiment of the present disclosure.

FIG. 4 is a flowchart showing the process related to the switching of the active planes (ACV switching process) in the activation method according to the present embodiment. The process shown in this flowchart is executed by each of the ECUs 10, 20, that are started when the start switch 50 is turned ON. A series of processes shown in FIG. 4 is executed in parallel by the ECUs 10, 20, 30. The ECU (ECU 10, ECU 20, or ECU 30) that is started in response to the operation to turn ON the start switch 50 and executes the series of processes shown in FIG. 4 is hereinafter referred to as "started ECU".

Referring to FIG. 4 together with FIGS. 1 and 2, the started ECU determines in Step S31 whether the switching flag of the ECU is "ON". When the switching flag is "ON" (YES in Step S31), the started ECU executes the ACV switching process in Step S32. For example, the ECU 10 switches the active plane P1 from the first storage area 121 to the second storage area 122. Thus, the second storage area 122 is set as the active plane P1. The ECU 20 switches the active plane P2 from the first storage area 221 to the second storage area 222. Thus, the second storage area 222 is set as the active plane P2. The ECU 30 switches the active plane P3 from the first storage area 321 to the second storage area 322. Thus, the second storage area 322 is set as the active plane P3.

After the ACV switching process is executed, the started ECU turns OFF the switching flag in Step S33. In Step S34, the started ECU activates the update program (new software) stored in the new active plane switched in Step S32. When the process of Step S34 is executed, the series of processes shown in FIG. 4 is terminated.

When the switching flag is "OFF" (NO in Step S31), the started ECU activates the control program (old software) stored in the active plane in Step S35 without executing the ACV switching process. For example, when any of the ECUs 10, 20, 30 is shut down during the preparation for activation due to a momentary power failure or the like, the switching flag is not turned ON by the process shown in FIG. 3 (Step S18 or S26). Therefore, determination is made as "NO" in Step S31. In this case, the ECUs 10, 20, 30 are in the installation completion state. Therefore, the process shown in FIG. 3 is executed again when the start switch 50 is turned OFF next time. Determination is made as "NO" in Step S31 also when the update program is not installed in the started ECU. In this case, the process shown in FIG. 3 is not executed for the started ECU. The process of Step S35 is executed, and then the series of processes shown in FIG. 4 is terminated. When the ACV switching process is executed in Step S32, the installation completion state may be terminated.

As described above, in the control system according to the present embodiment (control system for the vehicle 100), all the ECUs 10, 20, 30 are shut down when all the ECUs 10, 20, 30 are brought into the switching-ready state (Steps S15, S19, S24, S27 in FIG. 3). When all the ECUs 10, 20, 30 are shut down in the switching-ready state, each of the ECUs 10, 20, 30 executes the series of processes shown in FIG. 4 at the next startup. The ECUs 10, 20, 30 set the storage areas in which the updated versions of the control programs are installed (second storage areas 122, 222, 322) as the active planes (Step S32). In the series of processes shown in FIG. 3, when at least one of the ECUs 10, 20, 30 is shut down before being brought into the switching-ready state, all the ECUs 10, 20, 30 are shut down while the switching flags of the ECUs 10, 20, 30 are OFF (Steps S16, S19, S25, S27). In this case, determination is made as "NO" in Step S31 of FIG. 4 at the next startup of the ECUs. Therefore, none of the ECUs 10, 20, 30 switches the active plane.

Figure 5:
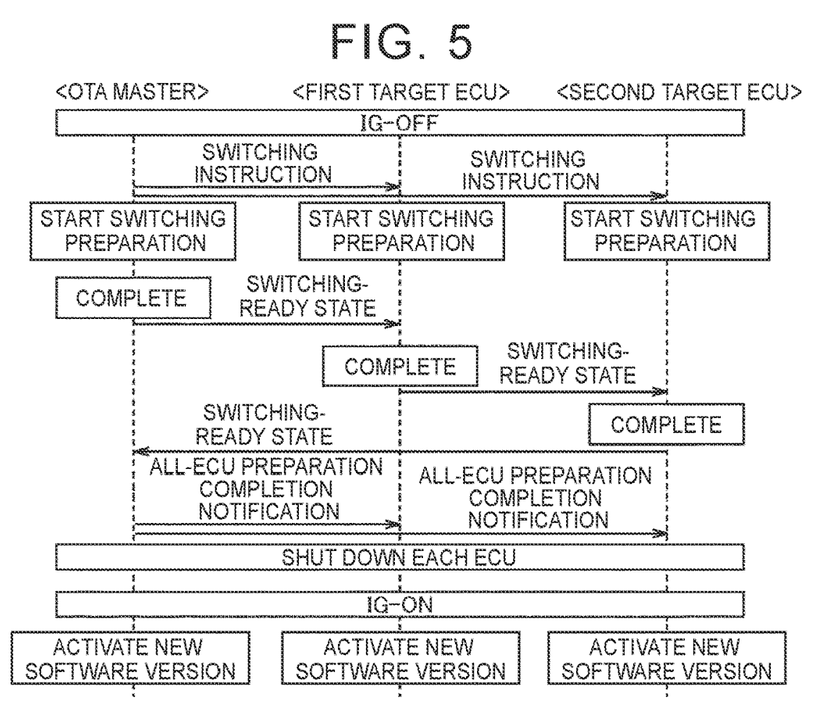
FIG. 5 is a diagram illustrating an example of an operation after completion of installation in the control devices in the control system according to the embodiment of the present disclosure.

FIG. 5 is a diagram illustrating an example of an operation after the completion of the installation in the ECUs 10, 20, 30. Referring to FIG. 5, when the start switch 50 is turned OFF with the update programs (updated versions of the control programs) installed in the storage areas other than the active planes of the ECUs 10, 20, 30, the ECU 10 (OTA master) transmits the switching instructions to the ECU 20 (first target ECU) and the ECU 30 (second target ECU).

When the ACV preparation process of the ECU 10 is completed, the ECU transmits the first preparation completion signal to the ECU 20. When the ACV preparation process of the ECU 20 is then completed, the ECU 20 transmits the second preparation completion signal to the ECU 30. When the ACV preparation process of the ECU is then completed, the ECU 30 transmits the third preparation completion signal to the ECU 10. In this manner, the ECUs 10, 20, 30 exchange the preparation completion signals among the ECUs through one-way ring communication.

When the ECU 10 receives the third preparation completion signal, the ECU 10 transmits the all-ECU preparation completion notification (shutdown instruction) to each of the ECUs 20, 30. As a result, the switching flags of the ECUs 10, 20, 30 are turned ON. Then, all the ECUs 10, 20, 30 are shut down.

When the start switch 50 is turned ON after all the ECUs 10, 20, 30 have been shut down in the switching-ready state as described above, the ECUs 10, 20, 30 activate the update programs (software products of new versions).

As described above, the control program update method according to the present embodiment includes the processes shown in FIGS. 2 to 4. Specifically, before the series of processes shown in FIG. 3, the ECUs 10, 20, 30 install the updated versions of the control programs stored in the execution storage areas of the ECUs 10, 20, 30 (first storage areas 121, 221, 321) into the storage areas other than the execution storage areas of the ECUs 20, 30 (second storage areas 122, 222, 322) (see FIG. 2). In the series of processes shown in FIG. 3, the ECUs 10, 20, 30 in which the updated versions of the control programs have been installed prepare for the switching of the execution storage areas. In the series of processes shown in FIG. 3, all the ECUs 10, 20, 30 are shut down when all the ECUs 10, 20, have completed the preparation for the switching of the execution storage areas. All the ECUs 10, 20, 30 that have been shut down in the switching-ready state by the series of processes shown in FIG. 3 switch the execution storage areas to the storage areas in which the updated versions of the control programs have been installed (second storage areas 122, 222, 322) at the next startup by the series of processes shown in FIG. 4.

In the control program update method, when all the control devices (ECUs 20, 30) are shut down in the switching-ready state, the control devices switch the active planes at the next startup. It is unlikely that any of the control devices is shut down due to a momentary power failure or the like during the short period immediately after the startup (period during which the active planes are switched). Thus, according to the control program update method, it is possible to suppress the software inconsistency among the control devices when the software products are updated in the control devices.

In the above embodiment, the ECUs 10, 20, 30 exchange the preparation completion signals among the ECUs through the ring communication. The ring communication makes it easier to suppress tightness of communication among the ECUs. The present disclosure is not limited to this case, and the ECUs 10, 20, 30 may exchange the preparation completion signals among the ECUs through star communication.

Figure 6:
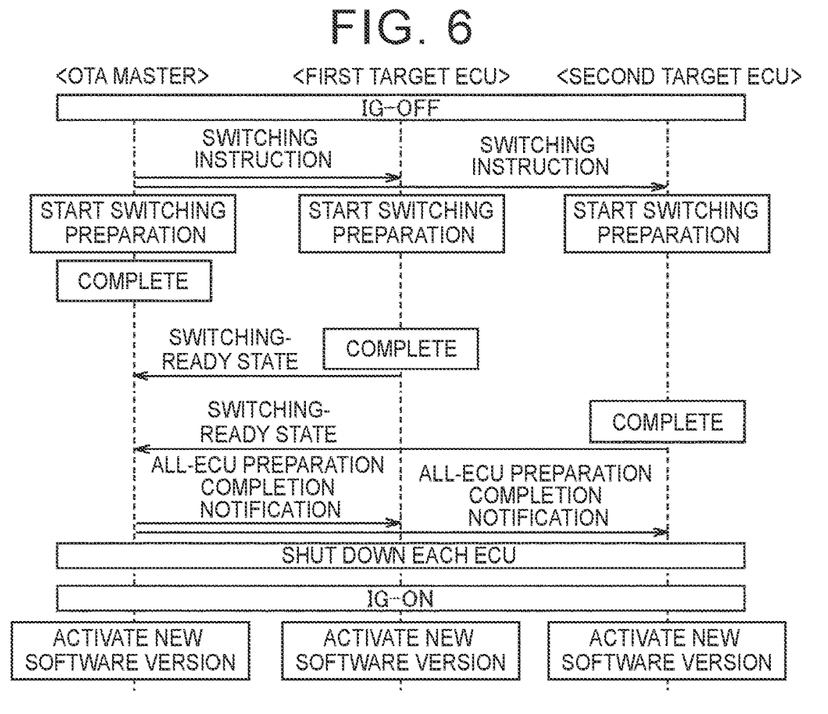
FIG. 6 is a diagram showing a first modification of the operation shown in FIG. 5.

FIG. 6 is a diagram showing a first modification of the operation shown in FIG. 5. Referring to FIG. 6, in this modification, when the ACV preparation process of the ECU 20 is completed after the ECU 10 has transmitted the switching instruction, the ECU 20 transmits the second preparation completion signal to the ECU 10. When the ACV preparation process of the ECU 30 is completed, the ECU 30 transmits the third preparation completion signal to the ECU 10. In this manner, the ECUs 10, 20, 30 exchange the preparation completion signals among the ECUs through star communication centered on (with respect to) the ECU 10.

When the ECU 10 receives both the second and third preparation completion signals and the ACV preparation process of the ECU 10 is completed, the ECU 10 transmits the all-ECU preparation completion notification (shutdown instruction) to each of the ECUs 20, 30. As a result, the switching flags of the ECUs 10, 20, 30 are turned ON. Then, all the ECUs 10, 20, 30 are shut down.

With the method of the first modification as well, all the ECUs 10, 20, 30 can be shut down when all the ECUs 10, 20, 30 are brought into the switching-ready state.

In the above embodiment, all the control devices (ECUs 10, 20, 30) having the OTA function are targets for software update by OTA (OTA targets). The present disclosure is not limited to this case, and a part of the control devices having the OTA function may be the OTA target.

Figure 7:
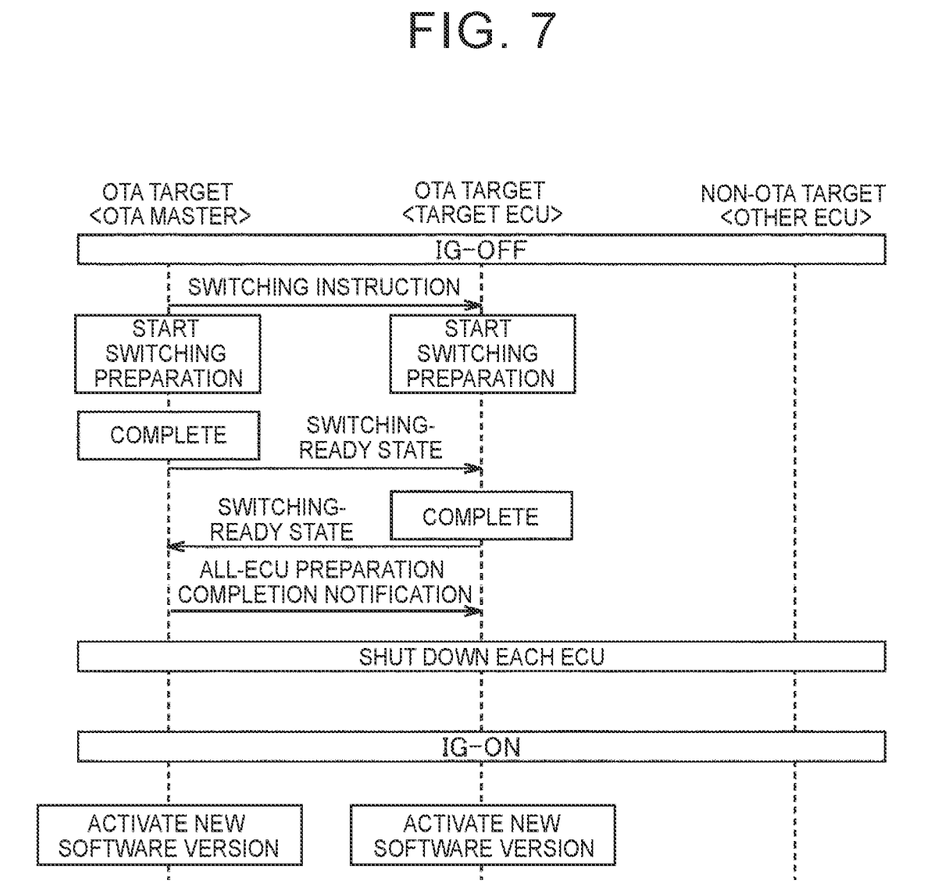
FIG. 7 is a diagram showing a second modification of the operation shown in FIG. 5.

FIG. 7 is a diagram showing a second modification of the operation shown in FIG. 5. Referring to FIG. 7, in this modification, the ECU 10 (OTA master) identifies the OTA target in Step S11 of FIG. 3. The ECU 10 may identify the OTA target based on the distribution package received from the OTA center 1000 (for example, an identifier of the target ECU or a difference in the update data). When the series of processes of Steps S11 to S19 is started while the updated version of the control program is not installed in either of the ECUs 20, 30, the ECU 10 determines in which of the ECUs 20, 30 the updated version of the control program is installed. The ECU 10 transmits the switching instruction to the target ECU that is the OTA target (that is, the ECU in which the updated version of the control program is installed). The ECU 10 does not transmit the switching instruction to the ECU that is not the OTA target (that is, the ECU in which the updated version of the control program is not installed). In the example shown in FIG. 7, the ECUs 10, 20 are the OTA targets, and the ECU 30 (other ECU) is not the OTA target.

When the ACV preparation process of the ECU 10 is completed after the ECU 10 has transmitted the switching instruction, the ECU 10 transmits the first preparation completion signal to the ECU 20 (target ECU). When the ACV preparation process of the ECU 20 is then completed, the ECU 20 transmits the second preparation completion signal to the ECU 10. When the ECU 10 receives the second preparation completion signal, the ECU 10 transmits the all-ECU preparation completion notification (shutdown instruction) to the ECU 20. As a result, the switching flags of the ECUs 10, 20 are turned ON. After then, the ECUs 10, 20 are shut down. The ECU 30 that is not the OTA target may be shut down together with the ECUs 10, 20, or may be shut down in response to an operation to turn OFF the start switch 50.

With the configuration of the second modification, the switching instruction is not transmitted to the control device in which the new software is not installed. Thus, unnecessary communication is suppressed.

The configuration of a local area network (LAN) that connects the ECUs may be changed as appropriate depending on the communication mode. As the LAN configuration, any network topology may be adopted among a bus type, a ring type, and a star type. The control device (ECU) that transmits the switching instruction and the shutdown instruction is not limited to the OTA master, and may be a representative device selected from among the target ECUs. The number of ECUs having the OTA function in the vehicle is not limited to three, and may be four or more and less than 10, or may be 10 or more.

The control program to be updated is not limited to the driving assistance control program such as the autonomous driving control program described above, and may be any program. It is not necessary that the vehicle be configured to execute the autonomous driving.

The vehicle may be an xEV other than the BEV. The vehicle may be a PHEV or an HEV that includes an internal combustion engine (for example, a gasoline engine, a biofuel engine, or a hydrogen engine). The vehicle is not limited to a four-wheeled passenger vehicle, and may be a bus or a truck, or may be a three-wheeled xEV. The in-vehicle battery may be chargeable in a contact manner, may be chargeable in a non-contact manner (wirelessly) while the vehicle is parked or traveling, or may include a replaceable battery. The vehicle may include a solar panel. The vehicle may have a flight function. The vehicle may be a Mobility as a Service (MaaS) vehicle. The MaaS vehicle is a vehicle managed by a MaaS provider. The vehicle may be a multi-purpose vehicle to be customized depending on the purpose of use of the user. The vehicle may be a mobile-shop vehicle, a robot taxi, an automated guided vehicle (AGV), or an agricultural machine. The vehicle may be a small-sized unmanned or single-seater BEV (for example, a last-mile BEV).

The above various modifications may be implemented in any combination. The embodiment disclosed herein should be construed as illustrative in all respects and not restrictive. The scope of the present disclosure is shown by the claims rather than by the above description of the embodiment and is intended to include all modifications within the meaning and scope equivalent to the claims.

What is claimed is:

1. A control system comprising a plurality of control devices, each of the control devices including a plurality of storage areas, each of the control devices being configured to:

execute a control program stored in a first storage area set as an execution storage area, the first storage area being any storage area among the plurality of storage areas;

execute a switching preparation in synchronization with other control devices of the plurality of control devices, the switching preparation being performed when each of the control devices updates the control program in a state in which an updated version of the control program has been installed on a writing plane of each of the control devices, the writing plane being a second storage area other than the first storage area, the switching preparation being a preparation for a setting of the writing plane as the execution storage area;

initiate a synchronized shutdown of all of the control devices only after each one of the control devices has completed the switching preparation; and set the writing plane as the execution storage area at a next startup only when all the control devices are shut down in a state in which the switching preparation has been completed in all the control devices, wherein the control devices include a first control device, a second control device, and a third control device, wherein the first control device is configured to
receive a shutdown request from a user,
when the updated versions of the control programs are installed in all the first control device, the second control device, and the third control device at a time of reception of the shutdown request by the first control device, transmit a switching instruction to each of the second control device and the third control device, and
start the switching preparation after the switching instruction is transmitted, and wherein each of the second control device and the third control device is configured to start the switching preparation when the switching instruction is received.

2. The control system according to claim 1, wherein all the control devices are configured not to switch the setting of the execution storage area at the next startup when at least one of the control devices is shut down before the switching preparation is completed in the at least one of the control devices.

3. The control system according to claim 2, wherein:
each of the control devices is configured to, when each of the control devices has completed the switching preparation, transmit a preparation completion signal indicating that the switching preparation has been completed; and
the control devices are configured to exchange the preparation completion signals with each other through ring communication.

4. The control system according to claim 2, wherein:
each of the control devices is configured to, when each of the control devices has completed the switching preparation, transmit a preparation completion signal indicating that the switching preparation has been completed; and
the control devices are configured to exchange the preparation completion signals with each other through star communication.

5. The control system according to claim 1, wherein:
the first control device is configured to, when the first control device updates the control program in a state in which the updated version of the control program is not installed in either the second control device or the third control device, determine in which of the second control device and the third control device the updated version of the control program is installed;
the first control device is configured to transmit the switching instruction to a control device in which the first control device determines that the updated version of the control program is installed; and the first control device is configured not to transmit the switching instruction to the control device in which the first control device determines that the updated version of the control program is not installed.

6. The control system according to claim 1, wherein:
each of the control devices is configured to control a vehicle;
the vehicle includes a start switch for the user to start a vehicle system;
the first control device is configured to receive an input of the shutdown request in response to an operation of the user to turn OFF the start switch; and
each of the control devices is configured to start in response to an operation of the user to turn ON the start switch.

7. A control device comprising:
one or more memories including a plurality of storage areas; and
one or more processors configured to:
set a first storage area as an execution storage area among the plurality of storage areas;
execute a control program stored in the first storage area set as the execution storage area among the plurality of storage areas; and
install an update program that is an updated version of the control program on a writing plane, the writing plane being a second storage area other than the first storage area, wherein:
when each of a plurality of control devices including the control device updates the control program in a state in which the first storage area is set as the execution storage area and the update program is installed in the second storage area set as the writing plane,
the one or more processors are configured to execute a switching preparation in synchronization with other control devices of the plurality of control devices, the switching preparation being performed, the switching preparation being a preparation for a setting of the writing plane as the execution storage area, and
the control device is configured to initiate a synchronized shutdown of all of the control devices only after each one of the control devices has completed the switching preparation; and
the one or more processors are configured to switch the execution storage area from the first storage area to the second storage area at a next startup of the control device that is shut down in a state in which the switching preparation has been completed,
wherein the control devices include a first control device, a second control device, and a third control device,
wherein the first control device is configured to
receive a shutdown request from a user,
when the updated versions of the control programs are installed in all the first control device, the second control device, and the third control device at a time of reception of the shutdown request by the first control device, transmit a switching instruction to each of the second control device and the third control device, and
start the switching preparation after the switching instruction is transmitted, and
wherein each of the second control device and the third control device is configured to start the switching preparation when the switching instruction is received.

8. A control program update method comprising:
installing, in a writing plane of each of a plurality of control devices, an updated version of a control program stored in a first storage area set as an execution storage area among a plurality of storage areas of each of the control devices, the writing plane being a second storage area other than the first storage area;
executing a switching preparation in synchronization with other control devices of the plurality of control devices, the switching preparation being performed by each of the control devices in which the updated version of the control program has been installed, the switching preparation being a preparation for a setting of the writing plane as the execution storage area;
initiating a synchronized shutdown of all of the control devices only after each one of the control devices has completed the switching preparation; and
setting the writing plane as the execution storage area at a next startup by all the control devices that are shut down in a state in which the switching preparation has been completed,
wherein the control devices include a first control device, a second control device, and a third control device,
wherein the method further comprises
receiving, at the first control device, a shutdown request from a user,
when the updated versions of the control programs are installed in all the first control device, the second control device, and the third control device at a time of reception of the shutdown request by the first control device, transmitting, by the first control device, a switching instruction to each of the second control device and the third control device, and
starting, by the first control device, the switching preparation after the switching instruction is transmitted, and
wherein each of the second control device and the third control device is configured to start the switching preparation when the switching instruction is received.

9. A non-transitory storage medium storing a function for causing a computer to execute the control program update method according to claim 8.

* * * * *